(12) United States Patent
Su et al.

(10) Patent No.: US 11,910,376 B2
(45) Date of Patent: Feb. 20, 2024

(54) DATA TRANSMISSION METHOD, AND TERMINAL AND NETWORK DEVICE

(71) Applicant: DATANG MOBILE COMMUNICATIONS EQUIPMENT CO., LTD., Beijing (CN)

(72) Inventors: Xin Su, Beijing (CN); Runhua Chen, Beijing (CN); Qiubin Gao, Beijing (CN); Qiuping Huang, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 114 days.

(21) Appl. No.: 17/268,051

(22) PCT Filed: Jul. 31, 2019

(86) PCT No.: PCT/CN2019/098618
§ 371 (c)(1),
(2) Date: Feb. 11, 2021

(87) PCT Pub. No.: WO2020/034842
PCT Pub. Date: Feb. 20, 2020

(65) Prior Publication Data
US 2021/0321431 A1    Oct. 14, 2021

(30) Foreign Application Priority Data

Aug. 17, 2018 (CN) .......................... 201810942469.5

(51) Int. Cl.
*H04W 72/12* (2023.01)
*H04W 72/1263* (2023.01)
(Continued)

(52) U.S. Cl.
CPC ...... *H04W 72/1263* (2013.01); *H04B 7/0486* (2013.01); *H04B 7/0608* (2013.01); *H04W 8/24* (2013.01)

(58) Field of Classification Search
CPC .......................... H04W 72/1263; H04W 72/12
See application file for complete search history.

(56) References Cited

U.S. PATENT DOCUMENTS

| 2016/0309347 A1 | 10/2016 | Eyuboglu et al. |
| 2018/0062724 A1 | 3/2018 | Onggosanusi et al. |

(Continued)

FOREIGN PATENT DOCUMENTS

| CN | 107888246 A | 4/2018 |
| CN | 108111272 A | 6/2018 |

(Continued)

OTHER PUBLICATIONS

International Preliminary Report on Patentability from PCT/CN2019098618, dated Feb. 23, 2021, with English translation from WIPO.

(Continued)

*Primary Examiner* — Sulaiman Nooristany
(74) *Attorney, Agent, or Firm* — Ladas & Parry, LLP

(57) ABSTRACT

A data transmission method, a terminal and a network device are provided. The transmission method includes: acquiring a target uplink transmission manner corresponding to a transmission capability of a terminal; transmitting a data layer of uplink data via at least one antenna panel of the terminal according to a correspondence between data layers of the uplink data and antenna panels of the terminal in the target uplink transmission manner.

4 Claims, 7 Drawing Sheets

(51) Int. Cl.
*H04B 7/0456* (2017.01)
*H04B 7/06* (2006.01)
*H04W 8/24* (2009.01)

(56) References Cited

U.S. PATENT DOCUMENTS

| | | | |
|---|---|---|---|
| 2018/0183503 A1* | 6/2018 | Rahman | H04B 7/0486 |
| 2018/0206132 A1* | 7/2018 | Guo | H04B 7/0695 |
| 2019/0166610 A1 | 5/2019 | Lee et al. | |
| 2019/0229786 A1 | 7/2019 | Huang et al. | |
| 2019/0305833 A1 | 10/2019 | Kim et al. | |
| 2020/0128421 A1 | 4/2020 | Yang et al. | |
| 2020/0177416 A1 | 6/2020 | Jiang et al. | |
| 2020/0213979 A1 | 7/2020 | Chen et al. | |
| 2020/0275260 A1 | 8/2020 | Huang et al. | |

FOREIGN PATENT DOCUMENTS

| | | |
|---|---|---|
| CN | 108260133 A | 7/2018 |
| EP | 3629510 A1 | 4/2020 |
| JP | 2019523617 A | 8/2019 |
| JP | 2020523932 A | 8/2020 |
| JP | 2020529797 A | 10/2020 |
| JP | 2020536413 A | 12/2020 |
| WO | 2018026209 A1 | 2/2018 |
| WO | 2018026224 A1 | 2/2018 |
| WO | 2018031869 A1 | 2/2018 |
| WO | 2018117738 A1 | 6/2018 |

OTHER PUBLICATIONS

Written Opinion of of the International Searching Authority from PCT/CN2019098618, dated Oct. 30, 2019 with English translation from WIPO.

International Search Report from PCT/CN2019098618, dated Oct. 30, 2019 with English translation from WIPO.

"Discussion on cooperative transmission", R1-1707603, 3GPP TSG RAN WG1 Meeting #89, Hangzhou, P.R. China May 15-19, 2017.

"Discussion on UL multi-panel/TRP operation", R1-1714345, 3GPP TSG RAN WG1 Meeting #90, Prague, Czech Republic, Aug. 21-25, 2017.

First Office Action from TW app. No. 108127853, dated May 4, 2021, with machine English translation.

"Codebook based transmission for UL MIMO", R1-1705071, 3GPP TSG RAN EG1 Meeting #88bis, Spokane, USA, Apr. 3-7, 2017.

European Search Report for European Patent Application 19 850 657:8, dated Feb. 4, 2022.

First Ofice Action and search report for Indian Patent Application 202127010014, dated Feb. 1, 2022.

Partial Supplementary European Search Report from EP app. No. 19850657.8, dated Sep. 8, 2021, all pages.

Office Action from Korean Patent Application No. 10-2021-7007828 dated Jan. 18, 2023, and its English translation.

Nokia et al, "Correction on UL Antenna Port Indexing," 3GPP TSG RAN WG1 #94, R1-1809239, 3GPP, Gothenburg, Sweden, Aug. 20-4, 2018, server publication date (Aug. 10 2018).

Intel Corporation, "Summary of Codebook Based UL Transmission," 3GPP TSG RAN WG1 #92bis, R1-1805664, Sanya, China, Apr. 16-20, 2018, 3GPP server publication date (Apr. 24, 2018).

First Office Action for Japanese Patent Application 2021-507953 dated May 10, 2022, and its English Translation provided by Global Dossier.

"Remaining details on codebook based UL transmission," 3GPP TSG RAN WG1 Meeting 91, R1-1719527, Reno, USA, Nov. 27-Dec. 1, 2017, Source: ZTE, Sanechips, Agenda Item: 7.2.1.2, all pages.

Office action from corresponding Korean Patent Application No. 10-2021-7007828 dated Jul. 19, 2023, and its English translation.

Ericsson, R1-1720739, "Non-codebook based UL MIMO remaining details," 3GPP TSG RAN WG1 #91, 3GPP server publication date (Nov. 18, 2017), Reno, USA, Nov. 27-Dec. 1, 2017.

\* cited by examiner

DATA TRANSMISSION METHOD, AND TERMINAL AND NETWORK DEVICE

CROSS-REFERENCE TO RELATED APPLICATION

The present application is the U.S. national phase of PCT Application PCT/CN2019/098618 filed on Jul. 31, 2019, which claims a priority to the Chinese patent application No. 201810942469.5 filed in China on Aug. 17, 2018, the disclosures of which are incorporated herein by reference in their entireties.

TECHNICAL FIELD

The present disclosure relates to the field of communication application technology, in particular to a data transmission method, a terminal and a network device.

BACKGROUND

In the related art, user equipment (UE) or terminal provided with multiple transmitting antennas is capable of performing uplink beamforming. To determine an uplink (UL) beamforming matrix, UE in an RRC CONNECTED state may be configured semi-statically with multiple UE-dedicated uplink sounding reference signal (SRS) resources. An SRS signal transmitted on each SRS resource undergoes beamforming using a specific beamforming matrix. The UE transmits these SRS resources in the uplink. A transmission and reception point (TRP) measures signal qualities of different SRS resources and selects a preferable SRS resource. The TRP sends an index of the selected SRS resource (SRS resource indicator (SRI)) to the UE by means of downlink control information (DCI). The UE may infer the TRP's recommendation as to which uplink beamforming matrix (e.g., SRS resource) should be used in future uplink transmission from the SRI. Then, the UE can use the uplink beamforming matrix indicated by the SRI to perform the future uplink transmission.

UE may be provided with multiple antenna panels for uplink transmission. Each antenna panel is composed of a group of antenna elements. A specific quantity of antenna panels, a quantity of antenna elements and a layout of antenna elements within each panel depend on a specific implementation, and different UE may have different implementations. The UE may transmit one data layer from one panel at a time, or the UE may transmit one data layer from a subset of antenna panels (including more than one antenna panel) simultaneously, and the description is applicable to SRS resource (transmission of SRS signal) as well. However, no description regarding how a terminal can perform uplink data transmission by using its antenna panels, in the case that the terminal supports joint data transmission from multiple antenna panels, has been given in standards in the related art.

SUMMARY

An objective of the present disclosure is to provide a data transmission method, a terminal and a network device, to solve the problem that no description regarding how a terminal can perform uplink data transmission by using its antenna panels, in the case that the terminal supports joint data transmission from multiple antenna panels, has been given in standards in the related art.

To achieve the objective, the present disclosure provides a data transmission method, applied to a terminal provided with at least two antenna panels for uplink transmission, including:

acquiring a target uplink transmission manner corresponding to a transmission capability of the terminal;

transmitting a data layer of uplink data via at least one antenna panel of the terminal according to a correspondence between data layers of the uplink data and the antenna panels of the terminal in the target uplink transmission manner.

Optionally, the acquiring the target uplink transmission manner corresponding to the transmission capability of the terminal includes:

selecting, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or, reporting the transmission capability of the terminal to a network device, acquiring an uplink transmission manner indicated by the network device according to the transmission capability of the terminal, and determining the target uplink transmission manner according to the uplink transmission manner indicated by the network device; or, selecting, according to the transmission capability of the terminal, at least one uplink transmission manner among a plurality of preconfigured uplink transmission manners as a recommended uplink transmission manner and transmitting the recommended uplink transmission manner to a network device, acquiring an uplink transmission manner selected by the network device among the recommended uplink transmission manner, and determining the target uplink transmission manner according to the uplink transmission manner selected by the network device; or, reporting the transmission capability of the terminal to a network device, acquiring at least one recommended uplink transmission manner indicated by the network device according to the transmission capability of the terminal, and selecting the target uplink transmission manner among the at least one recommended uplink transmission manner.

Optionally, the transmission capability of the terminal includes at least one of:

a quantity of antenna panels supported by the terminal that are capable of simultaneous uplink transmission;

a quantity of uplink resource sets supported by the terminal that are available for beam management;

a quantity of antenna panels supported by the terminal that are capable of coherent transmission;

a scheduling indication manner supported by the terminal.

Optionally, the scheduling indication manner supported by the terminal includes at least one of following scheduling indication manners:

a first scheduling indication manner, referring to that each antenna panel of the terminal indicates target information;

a second scheduling indication manner, referring to that each antenna panel of the terminal indicates target information and an amplitude and/or phase weighting factor between any two antenna panels of the terminal;

a third scheduling indication manner, referring to that all antenna panels provided for the terminal indicate target information jointly;

where the target information includes transmit precoding matrix index (TPMI) and/or transmit rank index (TM).

Optionally, the plurality of preconfigured uplink transmission manners includes: a first uplink transmission manner, a second uplink transmission manner and a third uplink transmission manner;

where the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the selecting, according to the transmission capability of the terminal, at least one uplink transmission manner among a plurality of preconfigured uplink transmission manners as the target uplink transmission manner includes:

determining that the target uplink transmission manner is the first uplink transmission manner in a case that the quantity of antenna panels supported by the terminal that are capable of simultaneous uplink transmission is 1 or the quantity of uplink resource sets supported by the terminal that are available for beam management is 1;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

Optionally, in a case that the transmission capability of the terminal includes a scheduling indication manner supported by the terminal and the scheduling indication manner supported by the terminal includes at least two scheduling indication manners, prior to the selecting, according to the transmission capability of the terminal, at least one uplink transmission manner among a plurality of preconfigured uplink transmission manners as the target uplink transmission manner, the method further includes:

selecting, according to the transmission capability of the terminal, one scheduling indication manner among the at least two scheduling indication manners supported by the terminal as a scheduling indication manner of the terminal; or, reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or, reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or, identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal.

To achieve the objective, an embodiment of the present disclosure further provides a data transmission method, applied to a network device, including:

acquiring transmission information reported by a terminal, where the transmission information includes at least one recommended uplink transmission manner corresponding to a transmission capability of the terminal and/or the transmission capability of the terminal;

indicating an uplink transmission manner to the terminal according to the transmission information.

Optionally, the indicating the uplink transmission manner to the terminal according to the transmission information includes:

in a case that the transmission information is the transmission capability of the terminal, selecting, according to the transmission capability of the terminal, at least one uplink transmission manner among a plurality of preconfigured uplink transmission manners and indicating the at least one uplink transmission manner to the terminal; or, in a case that the transmission information is the at least one recommended uplink transmission manner corresponding to the transmission capability of the terminal and the transmission capability of the terminal, selecting, according to the transmission capability of the terminal, at least one uplink transmission manner among the at least one recommended uplink transmission manner and indicating the at least one uplink transmission manner to the terminal; or, in a case that the transmission information is the at least one recommended uplink transmission manner corresponding to the transmission capability of the terminal, selecting at least one uplink transmission manner among the at least one recommended uplink transmission manner and indicating the at least one uplink transmission manner to the terminal.

Optionally, the transmission capability of the terminal includes at least one of:
- a quantity of antenna panels supported by the terminal that are capable of simultaneous uplink transmission;
- a quantity of uplink resource sets supported by the terminal that are available for beam management;
- a quantity of antenna panels supported by the terminal that are capable of coherent transmission;
- a scheduling indication manner supported by the terminal.

Optionally, the scheduling indication manner supported by the terminal includes at least one of following scheduling indication manners:
- a first scheduling indication manner, referring to that each antenna panel of the terminal indicates target information;
- a second scheduling indication manner, referring to that each antenna panel of the terminal indicates target information and position information between any two antenna panels of the terminal, where the position information includes an amplitude and/or phase weighting factor;
- a third scheduling indication manner, referring to that all antenna panels provided for the terminal indicate target information jointly;
- where the target information includes transmit precoding matrix index (TPMI) and/or transmit rank index (TRI).

Optionally, the plurality of preconfigured uplink transmission manners includes: a first uplink transmission manner, a second uplink transmission manner and a third uplink transmission manner;
- where the first uplink transmission manner refers to that one antenna panel is selected among at least two antenna panels provided for the terminal, and all data layers of the uplink data are transmitted on the selected antenna panel;
- the second uplink transmission manner refers to that all data layers of the uplink data are transmitted on each antenna panel of the terminal;
- the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the selecting, according to the transmission capability of the terminal, at least one uplink transmission manner among a plurality of preconfigured uplink transmission manners and indicating the at least one uplink transmission manner to the terminal include:
- indicating the first uplink transmission manner to the terminal in a case that the quantity of antenna panels supported by the terminal that are capable of simultaneous uplink transmission is 1 or the quantity of uplink resource sets supported by the terminal that are available for beam management is 1;
- indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;
- indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;
- indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;
- indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;
- where M is a positive integer greater than 1.

Optionally, in a case that the transmission capability of the terminal includes a scheduling indication manner supported by the terminal and the scheduling indication manner supported by the terminal includes at least two scheduling indication manners, prior to the selecting, according to the transmission capability of the terminal, at least one uplink transmission manner among a plurality of preconfigured uplink transmission manners and indicating the at least one uplink transmission manner to the terminal, the method further includes:
- selecting, according to the transmission capability of the terminal, one scheduling indication manner among the at least two scheduling indication manners supported by the terminal as a scheduling indication manner of the terminal, and indicating the one scheduling indication manner to the terminal; or,
- selecting, according to the transmission capability of the terminal, at least one recommended scheduling indication manner among the at least two scheduling indication manners supported by the terminal, and indicating the at least one recommended scheduling indication manner to the terminal; or, selecting one scheduling indication manner among at least one recommended scheduling indication manner transmitted by the terminal as a scheduling indication manner of the terminal, and indicating the one scheduling indication manner to the terminal.

To achieve the objective, an embodiment of the present disclosure further provides a terminal, provided with at least two antenna panels for uplink transmission, including: a transceiver, a storage, a processor and a program stored in the storage and configured to be executed by the processor, where the processor is configured to execute the program perform:

acquiring a target uplink transmission manner corresponding to a transmission capability of the terminal;

transmitting a data layer of uplink data via at least one antenna panel of the terminal according to a correspondence between data layers of the uplink data and the antenna panels of the terminal in the target uplink transmission manner.

Optionally, the processor is further configured to execute the program perform:

selecting, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or, reporting the transmission capability of the terminal to a network device, acquiring an uplink transmission manner indicated by the network device according to the transmission capability of the terminal, and determining the target uplink transmission manner according to the uplink transmission manner indicated by the network device; or, selecting, according to the transmission capability of the terminal, at least one uplink transmission manner among a plurality of preconfigured uplink transmission manners as a recommended uplink transmission manner and transmitting the recommended uplink transmission manner to a network device, acquiring an uplink transmission manner selected by the network device among the recommended uplink transmission manner, and determining the target uplink transmission manner according to the uplink transmission manner selected by the network device; or, reporting the transmission capability of the terminal to a network device, acquiring at least one recommended uplink transmission manner indicated by the network device according to the transmission capability of the terminal, and selecting the target uplink transmission manner among the at least one recommended uplink transmission manner.

Optionally, the transmission capability of the terminal includes at least one of:

a quantity of antenna panels supported by the terminal that are capable of simultaneous uplink transmission;

a quantity of uplink resource sets supported by the terminal that are available for beam management;

a quantity of antenna panels supported by the terminal that are capable of coherent transmission;

a scheduling indication manner supported by the terminal.

Optionally, the scheduling indication manner supported by the terminal includes at least one of following scheduling indication manners:

a first scheduling indication manner, referring to that each antenna panel of the terminal indicates target information;

a second scheduling indication manner, referring to that each antenna panel of the terminal indicates target information and an amplitude and/or phase weighting factor between any two antenna panels of the terminal;

a third scheduling indication manner, referring to that all antenna panels provided for the terminal indicate target information jointly;

where the target information includes transmit precoding matrix index (TPMI) and/or transmit rank index (TM).

Optionally, the plurality of preconfigured uplink transmission manners includes: a first uplink transmission manner, a second uplink transmission manner and a third uplink transmission manner;

where the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the processor is further configured to execute the program perform:

determining that the target uplink transmission manner is the first uplink transmission manner in a case that the quantity of antenna panels supported by the terminal that are capable of simultaneous uplink transmission is 1 or the quantity of uplink resource sets supported by the terminal that are available for beam management is 1;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

Optionally, in a case that the transmission capability of the terminal includes a scheduling indication manner supported by the terminal and the scheduling indication manner supported by the terminal includes at least two scheduling indication manners, the processor is further configured to execute the program perform:

selecting, according to the transmission capability of the terminal, one scheduling indication manner among the at least two scheduling indication manners supported by the terminal as a scheduling indication manner of the terminal; or, reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or, reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or, identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal.

To achieve the objective, an embodiment of the present disclosure further provides a computer readable storage medium storing therein a computer program, where the computer program is configured to be executed by a processor to implement the steps of the foregoing data transmission method.

To achieve the objective, an embodiment of the present disclosure further provides a network device, including: a transceiver, a storage, a processor and a program stored in the storage and configured to be executed by the processor, where the processor is configured to execute the program perform:

acquiring, through the transceiver, transmission information reported by a terminal, where the transmission information includes at least one recommended uplink transmission manner corresponding to a transmission capability of the terminal and/or the transmission capability of the terminal;

indicating an uplink transmission manner to the terminal according to the transmission information.

Optionally, the processor is further configured to execute the program perform:

in a case that the transmission information is the transmission capability of the terminal, selecting, according to the transmission capability of the terminal, at least one uplink transmission manner among a plurality of preconfigured uplink transmission manners and indicating the at least one uplink transmission manner to the terminal; or, in a case that the transmission information is the at least one recommended uplink transmission manner corresponding to the transmission capability of the terminal and the transmission capability of the terminal, selecting, according to the transmission capability of the terminal, at least one uplink transmission manner among the at least one recommended uplink transmission manner and indicating the at least one uplink transmission manner to the terminal; or, in a case that the transmission information is the at least one recommended uplink transmission manner corresponding to the transmission capability of the terminal, selecting at least one uplink transmission manner among the at least one recommended uplink transmission manner and indicating the at least one uplink transmission manner to the terminal.

Optionally, the transmission capability of the terminal includes at least one of:

a quantity of antenna panels supported by the terminal that are capable of simultaneous uplink transmission;

a quantity of uplink resource sets supported by the terminal that are available for beam management;

a quantity of antenna panels supported by the terminal that are capable of coherent transmission;

a scheduling indication manner supported by the terminal.

Optionally, the scheduling indication manner supported by the terminal includes at least one of following scheduling indication manners:

a first scheduling indication manner, referring to that each antenna panel of the terminal indicates target information;

a second scheduling indication manner, referring to that each antenna panel of the terminal indicates target information and position information between any two antenna panels of the terminal, where the position information includes an amplitude and/or phase weighting factor;

a third scheduling indication manner, referring to that all antenna panels provided for the terminal indicate target information jointly;

where the target information includes transmit precoding matrix index (TPMI) and/or transmit rank index (TM).

Optionally, the plurality of preconfigured uplink transmission manners includes: a first uplink transmission manner, a second uplink transmission manner and a third uplink transmission manner;

where the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the processor is further configured to execute the program perform:

indicating the first uplink transmission manner to the terminal in a case that the quantity of antenna panels supported by the terminal that are capable of simultaneous uplink transmission is 1 or the quantity of uplink resource sets supported by the terminal that are available for beam management is 1;

indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

Optionally, in a case that the transmission capability of the terminal includes a scheduling indication manner supported by the terminal and the scheduling indication manner supported by the terminal includes at least two scheduling indication manners, the processor is further configured to execute the program perform:

selecting, according to the transmission capability of the terminal, one scheduling indication manner among the at least two scheduling indication manners supported by the terminal as a scheduling indication manner of the terminal, and indicating the one scheduling indication manner to the terminal; or, selecting, according to the transmission capability of the terminal, at least one recommended scheduling indication manner among the at least two scheduling indication manners supported by the terminal, and indicating the at least one recommended scheduling indication manner to the terminal; or, selecting one scheduling indication manner among at least one recommended scheduling indication manner transmitted by the terminal as a scheduling indication manner of the terminal, and indicating the one scheduling indication manner to the terminal.

To achieve the objective, an embodiment of the present disclosure further provides a computer readable storage medium storing therein a computer program, where the computer program is configured to be executed by a processor to implement the steps of the foregoing data transmission method.

To achieve the objective, an embodiment of the present disclosure further provides a terminal, provided with at least two antenna panels for uplink transmission, including:

a first acquisition module, configured to acquire a target uplink transmission manner corresponding to a transmission capability of the terminal;

a transmission module, configured to transmit a data layer of uplink data via at least one antenna panel of the terminal according to a correspondence between data layers of the uplink data and the antenna panels of the terminal in the target uplink transmission manner.

Optionally, the first acquisition module is configured to:

select, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or, report the transmission capability of the terminal to a network device, acquire an uplink transmission manner indicated by the network device according to the transmission capability of the terminal, and determine the target uplink transmission manner according to the uplink transmission manner indicated by the network device; or, select, according to the transmission capability of the terminal, at least one uplink transmission manner among a plurality of preconfigured uplink transmission manners as a recommended uplink transmission manner and transmitting the recommended uplink transmission manner to a network device, acquire an uplink transmission manner selected by the network device among the recommended uplink transmission manner, and determine the target uplink transmission manner according to the uplink transmission manner selected by the network device; or, report the transmission capability of the terminal to a network device, acquire at least one recommended uplink transmission manner indicated by the network device according to the transmission capability of the terminal, and select the target uplink transmission manner among the at least one recommended uplink transmission manner.

To achieve the objective, an embodiment of the present disclosure further provides a network device, including:

a second acquisition module, configured to acquire transmission information reported by a terminal, where the transmission information includes at least one recommended uplink transmission manner corresponding to a transmission capability of the terminal and/or the transmission capability of the terminal;

an indication module, configured to indicate an uplink transmission manner to the terminal according to the transmission information.

Optionally, the indication module is configured to:

in a case that the transmission information is the transmission capability of the terminal, select, according to the transmission capability of the terminal, at least one uplink transmission manner among a plurality of pre-configured uplink transmission manners and indicate the at least one uplink transmission manner to the terminal; or, in a case that the transmission information is the at least one recommended uplink transmission manner corresponding to the transmission capability of the terminal and the transmission capability of the terminal, select, according to the transmission capability of the terminal, at least one uplink transmission manner among the at least one recommended uplink transmission manner and indicate the at least one uplink transmission manner to the terminal; or, in a case that the transmission information is the at least one recommended uplink transmission manner corresponding to the transmission capability of the terminal, select at least one uplink transmission manner among the at least one recommended uplink transmission manner and indicating the at least one uplink transmission manner to the terminal.

The embodiments of the present disclosure have the following beneficial effects: in the above technical solution of the embodiments of the present disclosure, in the case that the terminal supports joint uplink data transmission from at least two antenna panels, according to a correspondence between data layers of the uplink data and the antenna panels of the terminal in the target transmission manner, a data layer of uplink data may be transmitted via one antenna panel to save terminal transmission power and reduce transmission complexity, or a data layer of uplink data may be transmitted jointly via multiple antenna panels to improve transmission rate.

DETAILED DESCRIPTION

To describe the technical problem to be solved, the technical solutions and the advantages of the present disclosure more clearly, embodiments are described in detail hereinafter with reference to the accompanying drawings.

To enable a person skilled in the art to better understand the technical solutions of the embodiments of the present disclosure, the following description is given.

In view of the important role played by the multiple-input multiple output (MIMO) technology in the improvement of the peak rate and system spectrum utilization, radio access technology standards such as long term evolution (LTE) or LTE-Advanced (LTE-A) are all established on the basis of the MIMO+orthogonal frequency division multiplexing (OFDM) technology. Performance gain of the MIMO technology results from the spatial degree of freedom obtainable from a multi-antenna system, thus a most important evolution direction of the MIMO technology in its standardization process is dimension expansion.

In LTE Rel-8, up to 4 layers of MIMO transmission may be supported. Rel-9 focuses on the enhancement of multi-user MIMO (MU-MIMO) technology, and up to 4 downlink data layers are supported in the MU-MIMO transmission in transmission mode (TM)-8. Rel-10 introduces the support for 8 antenna ports, which further improves the spatial resolution of channel state information and further augments the transmission capability of single-user MIMO (SU-MIMO) to up to 8 data layers. Rel-13 and Rel-14 introduce FD-MIMO technology and support up to 32 ports, enabling full dimensional and vertical beamforming.

To further improve the MIMO technology, large-scale antenna technology is introduced in mobile communication systems. For a base station, a full-digital large-scale antenna may be provided with up to 128/256/512 antenna elements and up to 128/256/512 transceivers, where each antenna element is connected to a transceiver. Pilot signals are transmitted via up to 128/256/512 antenna ports, so that a terminal may measure channel state information and give feedback. For a terminal, an antenna array with up to 32/64 antenna elements may be provided. Owing to the beamforming performed at both the base station and terminal sides, tremendous beamforming gain is acquired, to compensate for the signal attenuation resulting from path loss. Particularly in high frequency band communication, e.g., at 30 GHz frequency, the pass loss would render the coverage of radio signals very limited. By means of the large-scale antenna technology, the coverage of radio signals may be expanded to enable practical utilization.

Figure 1:
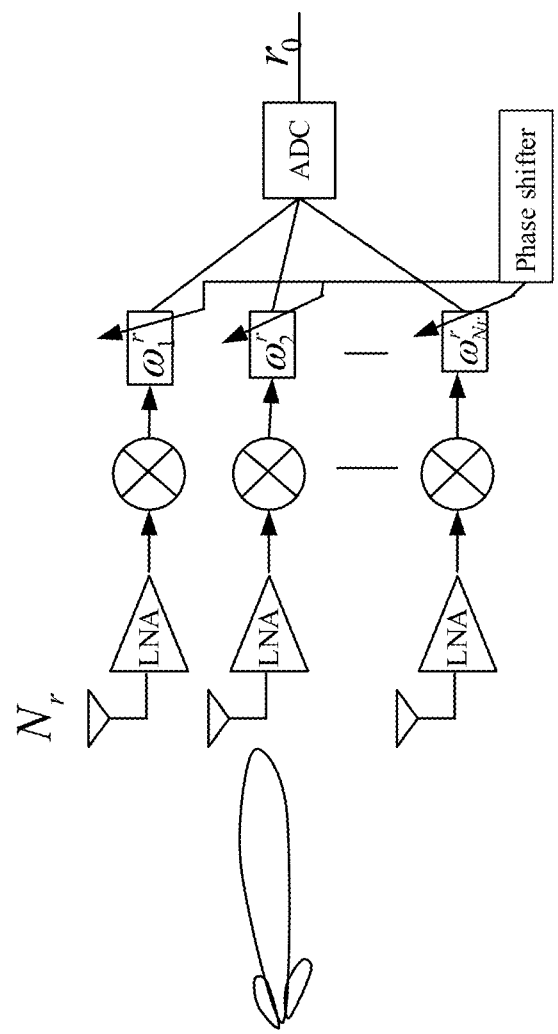
FIG. 1 is a schematic diagram of weighted beamforming of an intermediate frequency signal in an analog beamforming process in the related art.
Figure 1:
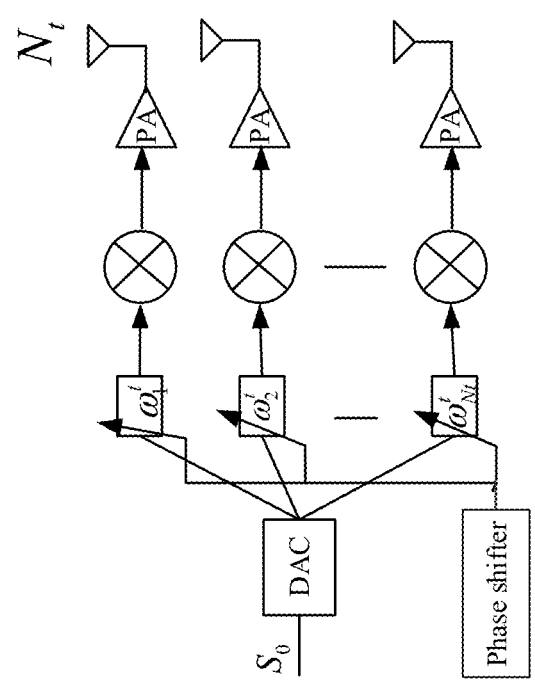
Figure 2:
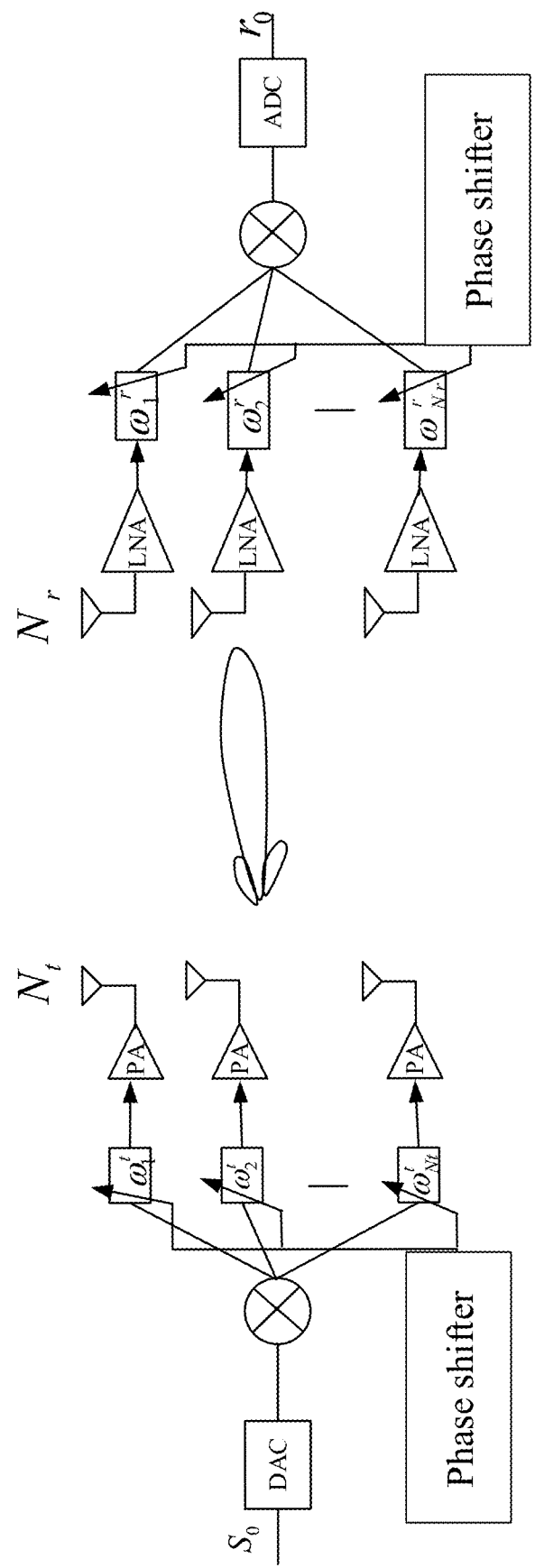
FIG. 2 is a schematic diagram of weighted beamforming of a radio frequency signal in an analog beamforming process in the related art.

In a full-digital antenna array, each antenna element has an independent transceiver, which dramatically increases the size, cost and power consumption of the device. Especially for the analog-to-digital converter (ADC) and digital-to-analog converter (DAC) in the transceiver, efforts for reducing power consumption and improving performance achieve little result. In order to reduce the size, cost and power consumption of the device, a technical solution based on analogy beamforming has been proposed. As shown in FIG. 1 and FIG. 2, a main feature of analog beamforming is to perform weighted beamforming on intermediate frequency signals (FIG. 1) or radio frequency signals (FIG. 2) by using a phase shifter.

Figure 3:
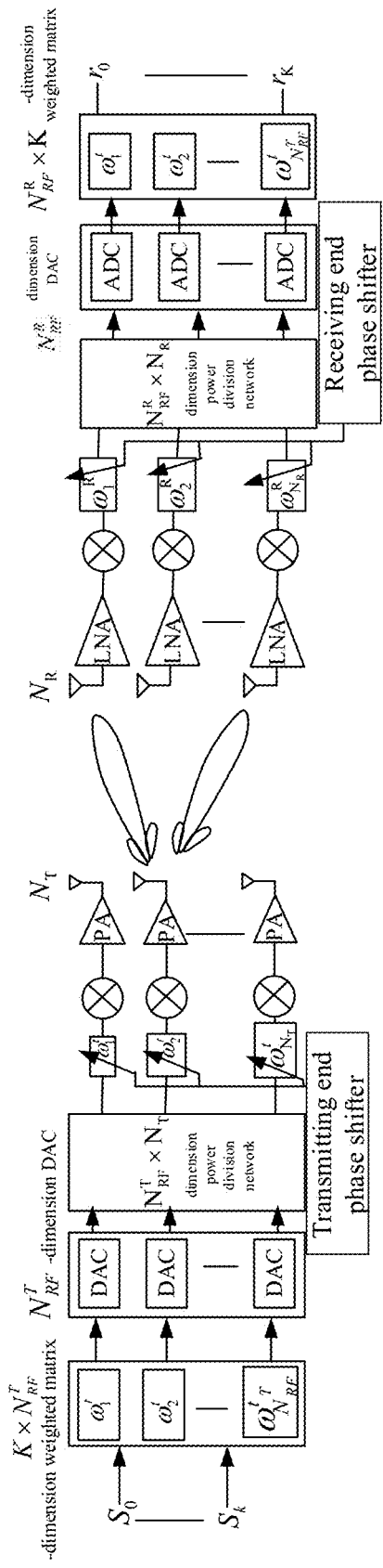
FIG. 3 is a schematic diagram of a hybrid digital-analog beamforming process in the related art.

To further improve the performance of analog beamforming, a hybrid digital-analog beamforming transmit-receive architecture has been proposed, as shown in FIG. 3. In FIG. 3, the transmitting end and the receiving end have $N_{RF}^T$ transceivers and $N_{RF}^R$ transceivers respectively, a quantity of antenna elements on the transmitting end $N^T > N_{RF}^T$ and a quantity of antenna elements on the receiving end $N^R > N_{RF}^R$ an maximum quantity of parallel transmission flows supported by the beamforming is $\min(N_{RF}^T, N_{RF}^R)$. The hybrid beamforming structure in FIG. 3 makes a balance between the flexibility of digital beamforming and the low complexity of analog beamforming.

Both the analog beamforming and the hybrid digital-analog beamforming require an adjustment of the analog beamforming weights on the transmitting end and the receiving end, such that a formed beam is directed to the opposite end of the communication. For downlink transmission, it is necessary to adjust the beamforming weight for the transmission at the base station side and the beamforming weight for the reception at the terminal side. For uplink transmission, it is necessary to adjust the beamforming weight for the transmission at the terminal side and the beamforming weight for the reception at the base station side. The beamforming weights are usually acquired through the transmission of training signals. In the downlink direction, the base station transmits downlink beam training signals; the terminal measures the downlink beam training signals, selects a best base station transmit beam, and feeds back information related to the beam to the base station, meanwhile selecting a corresponding best receive beam and storing it locally.

UE may have multiple antenna panels for uplink transmission, single-antenna-panel transmission and multi-antenna-panel transmission are described separately below.

(1) Single-Antenna-Panel Transmission

A single-panel UE may be configured with one SRS resource set for transmit beam scanning. Each SRS source set includes multiple SRS resources, and different SRS resources may be formed into different beams. Since each panel can only form one analog beam at a time, different SRS resources (corresponding to different beams) in a SRS resource set are transmitted at different time instants. The base station (gNB) determines an optimum transmit beam (i.e., the SRS resource with the best quality of reception) by receiving the SRS resource set, and indicates to the UE.

Then the gNB may configure a second SRS resource set for channel state information (CSI) acquisition, where the second SRS resource set includes multiple SRS resources and may use the same analog beam or different analog beams (based on the previous beam scanning). According to channel estimation, the gNB transmits an SRI pointing to the second SRS resource set (the SRS resource set for CSI acquisition) in a PUSCH scheduling grant. The UE performs PUSCH transmission according to the beam indicated by the SRI.

(2) Multi-Antenna-Panel Transmission

Similarly, if UE has multiple panels, multiple SRS resource sets may be configured for the UE to perform analog beam training, where each SRS set corresponds to a panel. Different SRS resources of a single SRS resource set (corresponding to one panel) are transmitted at different time instants. Since different SRS resource sets are mapped to different panels, the SRS resources of different SRS resource sets may be transmitted at the same time instant or different time instants. In this case, the SRS overhead changes linearly with the quantity of panels. For a terminal equipped with a large quantity of antenna panels (e.g., a vehicle, balloon and other air vehicle which has relatively less limitation on power and size), the SRS overhead may be substantial.

However, no description regarding how a terminal can perform uplink data transmission by using its antenna panels, in the case that the terminal supports joint data transmission from multiple antenna panels, has been given in standards in the related art.

Figure 4:
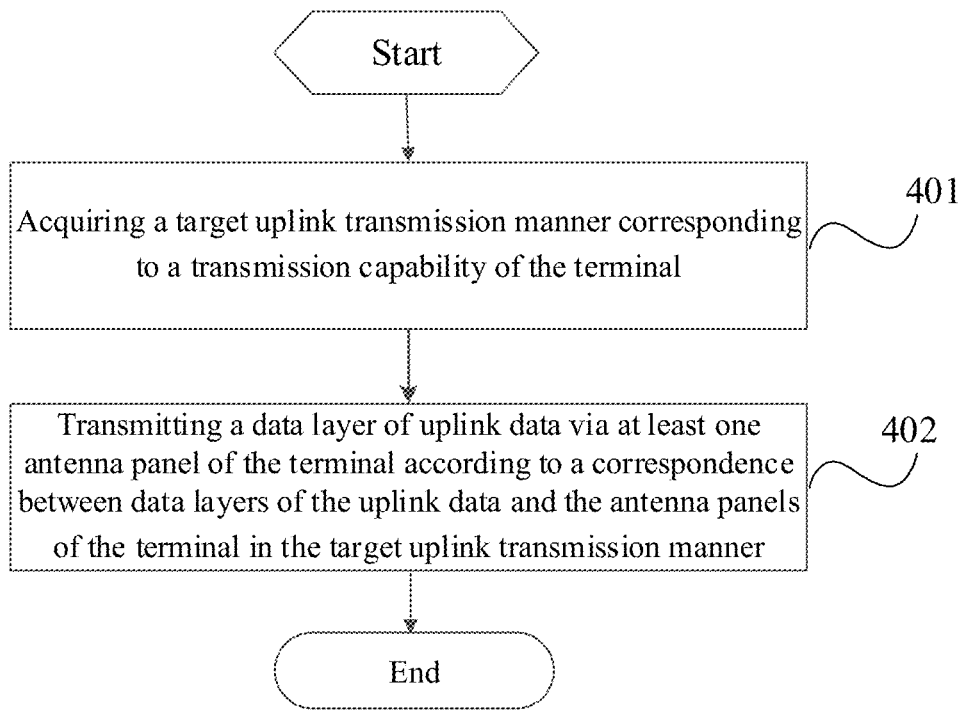
FIG. 4 is a first flow diagram of a data transmission method according to an embodiment of the present disclosure.

To solve the foregoing problem, as shown in FIG. 4, an embodiment of the present disclosure provides a data transmission method. The method is applied to a terminal provided with at least two antenna panels for uplink transmission and includes following step 401 and step 402.

Step 401: Acquiring a target uplink transmission manner corresponding to a transmission capability of the terminal.

Here, the terminal supports the simultaneous transmission of uplink data via at least two antenna panels, and the transmission capability of the terminal includes at least one of:

a quantity of antenna panels supported by the terminal that are capable of simultaneous uplink transmission (or, a quantity of SRS resource sets supported by the terminal that are available for beam management);

a quantity of antenna panels supported by the terminal that are capable of coherent transmission;

a scheduling indication manner supported by the terminal.

The scheduling indication manner supported by the terminal includes at least one of following scheduling indication manners:

a first scheduling indication manner, referring to that target information is indicated for each antenna panel of the terminal;

a second scheduling indication manner, referring to that the target information and an amplitude and/or phase weighting factor between any two antenna panels of the terminal are indicated for each antenna panel of the terminal;

a third scheduling indication manner, referring to that the target information is indicated jointly for all antenna panels provided for the terminal;

where the target information includes transmit precoding matrix index (TPMI) and/or transmit rank index (TM).

Step 402: Transmitting a data layer of uplink data via at least one antenna panel of the terminal according to a correspondence between data layers of the uplink data and the antenna panels of the terminal in the target uplink transmission manner.

Specifically, all data layers of uplink data are transmitted via at least one antenna panel of the terminal according to a correspondence between data layers of the uplink data and the antenna panels of the terminal in the target uplink transmission manner.

For example, the uplink data is a physical uplink shared channel (PUSCH), the PUSCH includes L data layers, where L is a positive integer greater than 1. In the target uplink transmission manner, L data layers correspond to two antenna panels, in specific, the first to the Kth layers of the L data layers correspond to the first antenna panel of the terminal, and the (K+1)th to the Lth layers correspond to the second antenna panel of the terminal, then the terminal transmits the first to the Kth layers of the PUSCH via the first antenna panel, and transmits the (K+1)th to the Lth layers of the PUSCH via the second antenna panel, where K is a positive integer greater than 1 and less than L. Or, in the target uplink transmission manner, L data layers correspond to one antenna panel, then one antenna panel is selected among the multiple antenna panels provided for the terminal according to the terminal capability and the L data layers of the PUSCH are transmitted via the selected antenna panel.

In the data transmission method according to the embodiment of the present disclosure, in the case that the terminal supports joint uplink data transmission from at least two antenna panels, according to a correspondence between data layers of the uplink data and the antenna panels of the terminal in the target transmission manner, a data layer of uplink data may be transmitted via one antenna panel to save terminal transmission power and reduce transmission complexity, or a data layer of uplink data may be transmitted jointly via multiple antenna panels to improve transmission rate.

Further, the acquiring the target uplink transmission manner corresponding to the transmission capability of the terminal in the step 401 includes:

selecting, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or, reporting the transmission capability of the terminal to a network device, acquiring an uplink transmission manner indicated by the network device according to the transmission capability of the terminal, and determining the target uplink transmission manner according to the uplink transmission manner indicated by the network device; or, selecting, according to the transmission capability of the terminal, at least one uplink transmission manner among a plurality of preconfigured uplink transmission manners as a recommended uplink transmission manner and transmitting the recommended uplink transmission manner to a network device, acquiring an uplink transmission manner selected by the network device among the recommended uplink transmission manner, and determining the target uplink transmission manner according to the uplink transmission manner selected by the network device; or, reporting the transmission capability of the terminal to a network device, acquiring at least one recommended uplink transmission manner indicated by the network device according to the transmission capability of the terminal, and selecting the target uplink transmission manner among the at least one recommended uplink transmission manner.

In an embodiment of the present disclosure, the plurality of preconfigured uplink transmission manners includes: a first uplink transmission manner, a second uplink transmission manner and a third uplink transmission manner.

The first uplink transmission manner refers to that one antenna panel is selected among at least two antenna panels provided for the terminal, and all data layers of the uplink data are transmitted on the selected antenna panel.

Figure 5:
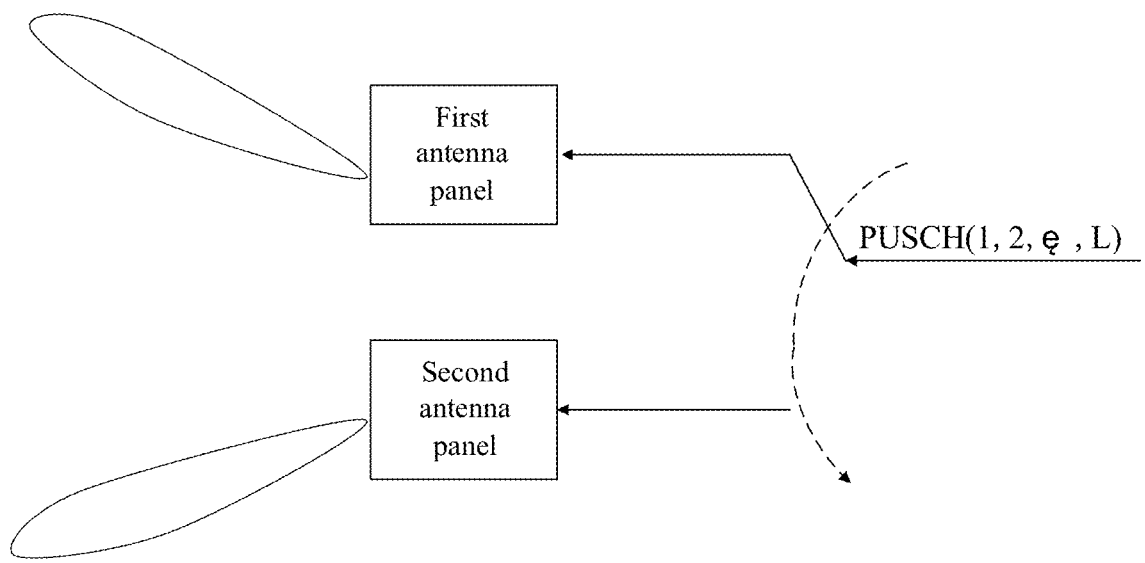
FIG. 5 is a schematic diagram of a first uplink transmission manner according to an embodiment of the present disclosure.

It is assumed the uplink data is a PUSCH, the PUSCH includes L data layers, where L is a positive integer greater than 1, and the terminal is equipped with a first antenna panel and a second antenna panel. As shown in FIG. 5, one antenna panel is selected among the two antenna panels, assuming the first antenna panel is selected, then the L data layers of the PUSCH are all transmitted via the first antenna panel.

Here, the first uplink transmission manner may save terminal transmission power and has lower complexity, and does not require a calibration between antenna panels.

The second uplink transmission manner refers to that all data layers of the uplink data are transmitted on each antenna panel of the terminal.

Figure 6:
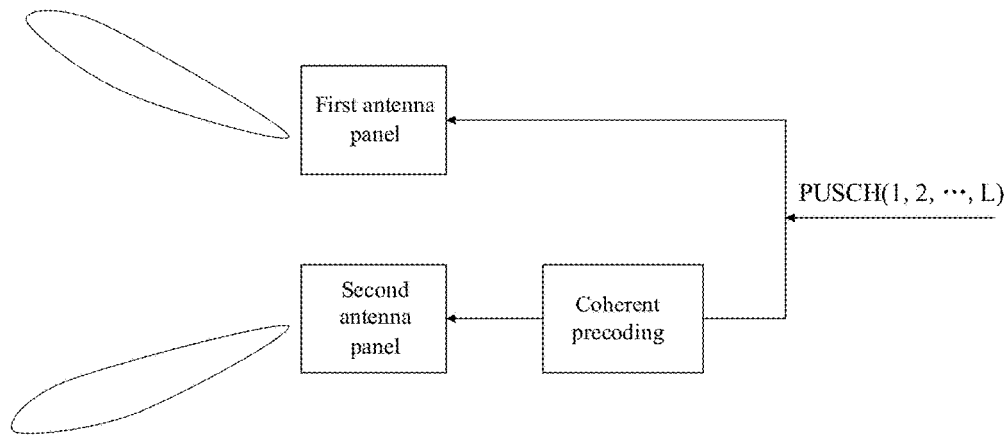
FIG. 6 is a schematic diagram of a second uplink transmission manner according to an embodiment of the present disclosure.

Specifically, all data layers of the uplink data are mapped through precoding to each antenna panel for transmission, as shown in FIG. 6, the L data layers of the PUSCH are transmitted via the first antenna panel and the second antenna panel.

Here, the second uplink transmission manner requires a calibration between various antenna panels to maintain a relatively small time domain error, frequency domain error, amplitude error and/or phase error, so as to meet the requirements of coherent transmission.

The third uplink transmission manner refers to that all data layers of the uplink data are divided into N groups, and each group of data layers is transmitted on one antenna panel, where there is a one-to-one correspondence between the groups of data layers and the antenna panels, N is a quantity of the antenna panels of the terminal, and N is a positive integer greater than 1.

Figure 7:
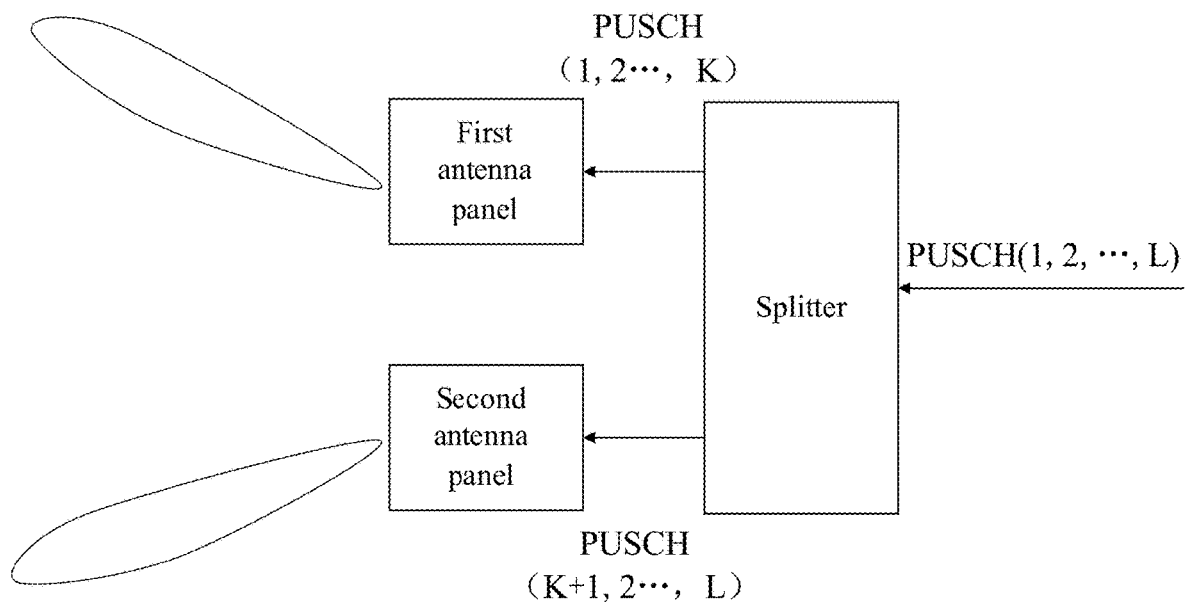
FIG. 7 is a schematic diagram of a third uplink transmission manner according to an embodiment of the present disclosure.

As shown in FIG. 7, the L data layers are divided into two groups, where the first to the Kth layers are in one group, and the (K+1)th to the Lth layers are in the other group. The first to the Kth layers are transmitted via the first antenna panel, and the (K+1)th to the Lth layers are transmitted via the second antenna panel.

In the third uplink transmission manner, a proper calibration between panels is not required.

Further, the selecting, according to the transmission capability of the terminal, at least one uplink transmission manner among a plurality of preconfigured uplink transmission manners as the target uplink transmission manner in the step 402 includes:

determining that the target uplink transmission manner is the first uplink transmission manner in a case that the quantity of antenna panels supported by the terminal that are capable of simultaneous uplink transmission is 1 or the quantity of uplink resource sets supported by the terminal that are available for beam management is 1; specifically, the uplink resource sets for beam management are SRS resource sets;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

In embodiments of the present disclosure, the transmission manner available to a terminal while performing uplink transmission depends to a great extent on the transmission capability of the UE. Thus, in embodiments of the present disclosure, a proper transmission manner may be selected for uplink data transmission according to the terminal capability through setting a correspondence between the transmission capabilities of the terminal and the transmission manners.

Further, in a case that the transmission capability of the terminal includes a scheduling indication manner supported by the terminal and the scheduling indication manner supported by the terminal includes at least two scheduling indication manners, prior to the selecting, according to the transmission capability of the terminal, at least one uplink transmission manner among a plurality of preconfigured uplink transmission manners as the target uplink transmission manner, the method further includes:

selecting, according to the transmission capability of the terminal, one scheduling indication manner among the at least two scheduling indication manners supported by the terminal as a scheduling indication manner of the terminal; or, reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or, reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or, identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal.

In the embodiments of the present disclosure, the determination of the scheduling indication manner of the terminal may be implemented in the aforementioned ways, thereby facilitating the subsequent selection of a corresponding uplink transmission manner according to the scheduling indication manner of the terminal.

Figure 8:
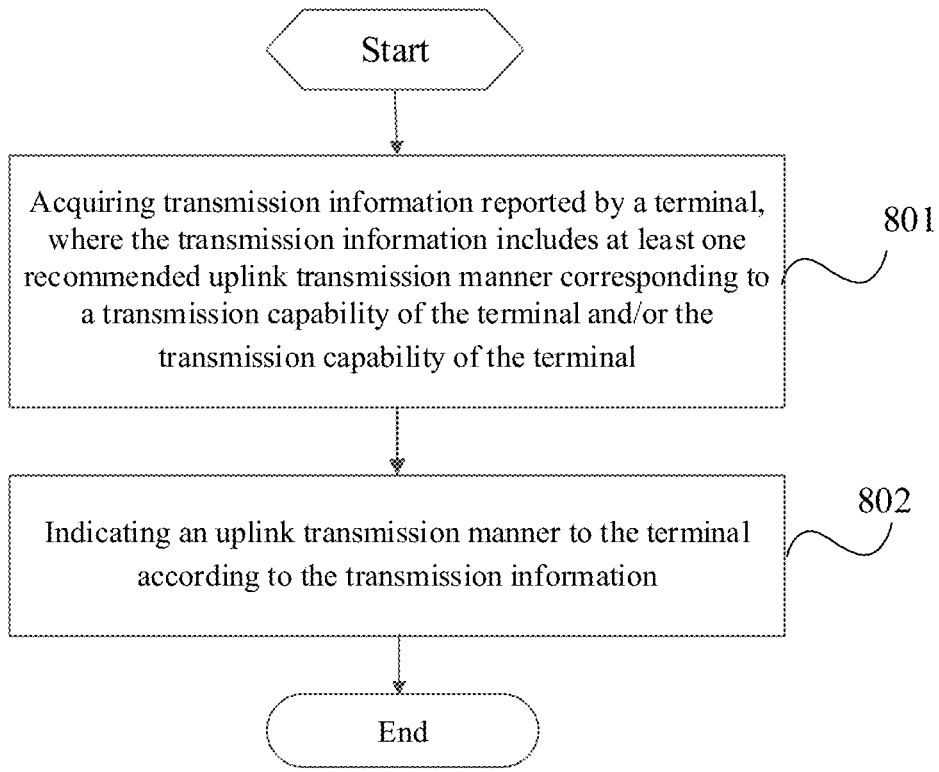
FIG. 8 is a second flow diagram of a data transmission method according to an embodiment of the present disclosure.

As shown in FIG. 8, an embodiment of the present disclosure further provides a data transmission method. The method is applied to a network device, which may be a base station specifically, and includes a step 801 and a step 802.

Step 801: Acquiring transmission information reported by a terminal, where the transmission information includes at least one recommended uplink transmission manner corresponding to a transmission capability of the terminal and/or the transmission capability of the terminal.

The transmission capability of the terminal includes at least one of:
  a quantity of antenna panels supported by the terminal that are capable of simultaneous uplink transmission;
  a quantity of uplink resource sets supported by the terminal that are available for beam management;
  a quantity of antenna panels supported by the terminal that are capable of coherent transmission;
  a scheduling indication manner supported by the terminal.

The scheduling indication manner supported by the terminal includes at least one of following scheduling indication manners:
  a first scheduling indication manner, referring to that target information is indicated for each antenna panel of the terminal;
  a second scheduling indication manner, referring to that the target information and position information between any two antenna panels of the terminal are indicated for each antenna panel of the terminal, where the position information includes an amplitude and/or phase weighting factor;
  a third scheduling indication manner, referring to that the target information is indicated jointly for all antenna panels provided for the terminal;
  where the target information includes transmit precoding matrix index (TPMI) and/or transmit rank index (TM).

The recommended uplink transmission manner is selected by the terminal among a plurality of preconfigured uplink transmission manners. The plurality of preconfigured uplink transmission manners includes: a first uplink transmission manner, a second uplink transmission manner and a third uplink transmission manner;
  where the first uplink transmission manner refers to that one antenna panel is selected among at least two antenna panels provided for the terminal, and all data layers of the uplink data are transmitted on the selected antenna panel;
  the second uplink transmission manner refers to that all data layers of the uplink data are transmitted on each antenna panel of the terminal;
  the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Step 802: Indicating an uplink transmission manner to the terminal according to the transmission information.

The uplink transmission manner includes a correspondence between data layers of the uplink data and the antenna panels of the terminal.

In the embodiment of the present disclosure, the network device indicates the uplink transmission manner to the terminal according to the transmission information reported by the terminal, so that the terminal determines the target uplink transmission manner according to the uplink transmission manner indicated by the network device, and transmits a data layer of the uplink data via at least one antenna panel of the terminal according to the correspondence between data layers of the uplink data and antenna panels of the terminal in the target uplink transmission manner.

Further, the indicating the uplink transmission manner to the terminal according to the transmission information in the step 802 includes:
  in a case that the transmission information is the transmission capability of the terminal, selecting, according to the transmission capability of the terminal, at least one uplink transmission manner among a plurality of preconfigured uplink transmission manners and indicating the at least one uplink transmission manner to the terminal; or,
  in a case that the transmission information is the at least one recommended uplink transmission manner corresponding to the transmission capability of the terminal and the transmission capability of the terminal, selecting, according to the transmission capability of the terminal, at least one uplink transmission manner among the at least one recommended uplink transmission manner and indicating the at least one uplink transmission manner to the terminal; or,
  in a case that the transmission information is the at least one recommended uplink transmission manner corresponding to the transmission capability of the terminal, selecting at least one uplink transmission manner among the at least one recommended uplink transmission manner and indicating the at least one uplink transmission manner to the terminal.

Specifically, the selecting, according to the transmission capability of the terminal, at least one uplink transmission manner among a plurality of preconfigured uplink transmission manners and indicating the at least one uplink transmission manner to the terminal include:
  indicating the first uplink transmission manner to the terminal in a case that the quantity of antenna panels supported by the terminal that are capable of simultaneous uplink transmission is 1 or the quantity of uplink resource sets supported by the terminal that are available for beam management is 1;
  indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;
  indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;
  indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;
  indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;
  where M is a positive integer greater than 1.

Further, in a case that the transmission capability of the terminal includes a scheduling indication manner supported by the terminal and the scheduling indication manner supported by the terminal includes at least two scheduling indication manners, prior to the selecting, according to the transmission capability of the terminal, at least one uplink transmission manner among a plurality of preconfigured uplink transmission manners and indicating the at least one uplink transmission manner to the terminal, the method further includes:
  selecting, according to the transmission capability of the terminal, one scheduling indication manner among the at least two scheduling indication manners supported by the terminal as a scheduling indication manner of the terminal, and indicating the one scheduling indication manner to the terminal; or,
  selecting, according to the transmission capability of the terminal, at least one recommended scheduling indication manner among the at least two scheduling indication manners supported by the terminal, and indicating the at least one recommended scheduling indication manner to the terminal; or,
  selecting one scheduling indication manner among at least one recommended scheduling indication manner transmitted by the terminal as a scheduling indication manner of the terminal, and indicating the one scheduling indication manner to the terminal.

In the embodiment of the present disclosure, the network device indicates the uplink transmission manner to the terminal according to the transmission information reported by the terminal, so that the terminal determines the target uplink transmission manner according to the uplink transmission manner indicated by the network device, and transmits a data layer of the uplink data via at least one antenna panel of the terminal according to the correspondence between data layers of the uplink data and antenna panels of the terminal in the target uplink transmission manner.

Figure 9:
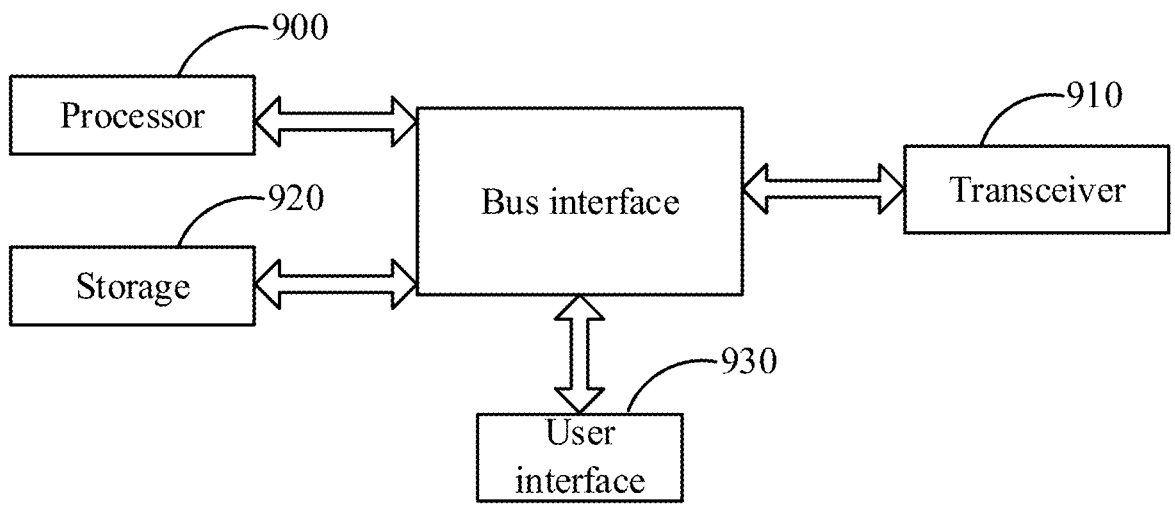
FIG. 9 is a structure diagram of a terminal according to an embodiment of the present disclosure.

As shown in FIG. 9, an embodiment of the present disclosure further provides a terminal. The terminal is provided with at least two antenna panels for uplink transmission and includes: a transceiver 910, a storage 920, a processor 900 and a computer program stored in the storage and configured to be executed by the processor, where the processor is configured to execute the computer program perform:
- acquiring a target uplink transmission manner corresponding to a transmission capability of the terminal;
- transmitting, through the transceiver, a data layer of uplink data via at least one antenna panel of the terminal according to a correspondence between data layers of the uplink data and the antenna panels of the terminal in the target uplink transmission manner.

In FIG. 9, a bus architecture may include any number of interconnected buses and bridges, and connects various circuits including one or more processors represented by the processor 900 and storage represented by the storage 920. The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, i.e., including a transmitter and a receiver, to provide a unit for communication with various other apparatuses on the transmission medium. For different UEs, the user interface 930 may be an interface capable of connecting externally or internally to a required device. The connected device includes, but is not limited to: a keypad, a display, a speaker, a microphone, a joystick or the like.

The processor 900 is responsible for supervising the bus architecture and normal operation and the storage 920 may store the data being used by the processor 900 during operation.

Optionally, the processor 900 is further configured to read the program in the storage 920 perform:
- selecting, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or,
- reporting the transmission capability of the terminal to a network device, acquiring an uplink transmission manner indicated by the network device according to the transmission capability of the terminal, and determining the target uplink transmission manner according to the uplink transmission manner indicated by the network device; or,
- selecting, according to the transmission capability of the terminal, at least one uplink transmission manner among a plurality of preconfigured uplink transmission manners as a recommended uplink transmission manner and transmitting the recommended uplink transmission manner to a network device, acquiring an uplink transmission manner selected by the network device among the recommended uplink transmission manner, and determining the target uplink transmission manner according to the uplink transmission manner selected by the network device; or,
- reporting the transmission capability of the terminal to a network device, acquiring at least one recommended uplink transmission manner indicated by the network device according to the transmission capability of the terminal, and selecting the target uplink transmission manner among the at least one recommended uplink transmission manner.

Optionally, the transmission capability of the terminal includes at least one of:
- a quantity of antenna panels supported by the terminal that are capable of simultaneous uplink transmission;
- a quantity of uplink resource sets supported by the terminal that are available for beam management;
- a quantity of antenna panels supported by the terminal that are capable of coherent transmission;
- a scheduling indication manner supported by the terminal.

Optionally, the scheduling indication manner supported by the terminal includes at least one of following scheduling indication manners:
- a first scheduling indication manner, referring to that target information is indicated for each antenna panel of the terminal;
- a second scheduling indication manner, referring to that the target information and an amplitude and/or phase weighting factor between any two antenna panels of the terminal are indicated for each antenna panel of the terminal;
- a third scheduling indication manner, referring to that the target information is indicated jointly for all antenna panels provided for the terminal;
- where the target information includes transmit precoding matrix index (TPMI) and/or transmit rank index (TM).

Optionally, the plurality of preconfigured uplink transmission manners includes: a first uplink transmission manner, a second uplink transmission manner and a third uplink transmission manner;
- where the first uplink transmission manner refers to that one antenna panel is selected among at least two antenna panels provided for the terminal, and all data layers of the uplink data are transmitted on the selected antenna panel;
- the second uplink transmission manner refers to that all data layers of the uplink data are transmitted on each antenna panel of the terminal;
- the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the processor 900 is further configured to read the program in the storage 920 perform:
- determining that the target uplink transmission manner is the first uplink transmission manner in a case that the quantity of antenna panels supported by the terminal that are capable of simultaneous uplink transmission is 1 or the quantity of uplink resource sets supported by the terminal that are available for beam management is 1;
- determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;
- determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

Optionally, in a case that the transmission capability of the terminal includes a scheduling indication manner supported by the terminal and the scheduling indication manner supported by the terminal includes at least two scheduling indication manners, the processor 900 is further configured to read the program in the storage 920 perform:

selecting, according to the transmission capability of the terminal, one scheduling indication manner among the at least two scheduling indication manners supported by the terminal as a scheduling indication manner of the terminal; or, reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or, reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or, identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal.

In some embodiments of the present disclosure, a computer readable storage medium is further provided. The computer readable storage medium stores therein a computer program. The computer program is configured to be executed by a processor to implement the following steps:

acquiring a target uplink transmission manner corresponding to a transmission capability of the terminal;

transmitting a data layer of uplink data via at least one antenna panel of the terminal according to a correspondence between data layers of the uplink data and the antenna panels of the terminal in the target uplink transmission manner.

The computer program, when being executed by a processor, can achieve all implementations of the embodiments of the data transmission method applied to the terminal side. To avoid repetition, a detailed description is omitted herein.

Figure 10:
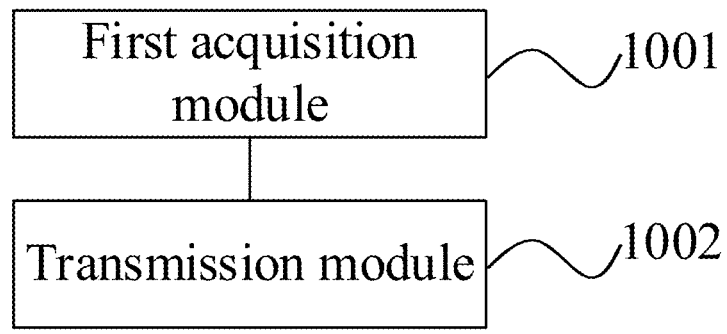
FIG. 10 is a modular diagram of a terminal according to an embodiment of the present disclosure.

As shown in FIG. 10, an embodiment of the present disclosure further provides a terminal. The terminal is provided with at least two antenna panels for uplink transmission and includes:

a first acquisition module 1001, configured to acquire a target uplink transmission manner corresponding to a transmission capability of the terminal;

a transmission module 1002, configured to transmit a data layer of uplink data via at least one antenna panel of the terminal according to a correspondence between data layers of the uplink data and the antenna panels of the terminal in the target uplink transmission manner.

In the terminal according to the embodiment of the present disclosure, the first acquisition module is configured to:

select, according to the transmission capability of the terminal, at least one uplink transmission manner among a plurality of preconfigured uplink transmission manners as the target uplink transmission manner, where correspondences between data layers of the uplink data and the antenna panels of the terminal in different uplink transmission manners are different from each other; or, report the transmission capability of the terminal to a network device, acquire an uplink transmission manner indicated by the network device according to the transmission capability of the terminal, and determine the target uplink transmission manner according to the uplink transmission manner indicated by the network device; or, select, according to the transmission capability of the terminal, at least one uplink transmission manner among a plurality of preconfigured uplink transmission manners as a recommended uplink transmission manner and transmitting the recommended uplink transmission manner to a network device, acquire an uplink transmission manner selected by the network device among the recommended uplink transmission manner, and determine the target uplink transmission manner according to the uplink transmission manner selected by the network device; or, report the transmission capability of the terminal to a network device, acquire at least one recommended uplink transmission manner indicated by the network device according to the transmission capability of the terminal, and select the target uplink transmission manner among the at least one recommended uplink transmission manner.

In the terminal according to the embodiment of the present disclosure, the transmission capability of the terminal includes at least one of:

a quantity of antenna panels supported by the terminal that are capable of simultaneous uplink transmission;

a quantity of uplink resource sets supported by the terminal that are available for beam management;

a quantity of antenna panels supported by the terminal that are capable of coherent transmission;

a scheduling indication manner supported by the terminal.

In the terminal according to the embodiment of the present disclosure, the scheduling indication manner supported by the terminal includes at least one of following scheduling indication manners:

a first scheduling indication manner, referring to that target information is indicated for each antenna panel of the terminal;

a second scheduling indication manner, referring to that the target information and an amplitude and/or phase weighting factor between any two antenna panels of the terminal are indicated for each antenna panel of the terminal;

a third scheduling indication manner, referring to that the target information is indicated jointly for all antenna panels provided for the terminal;

where the target information includes transmit precoding matrix index (TPMI) and/or transmit rank index (TM).

In the terminal according to the embodiment of the present disclosure, the plurality of preconfigured uplink transmission manners includes: a first uplink transmission manner, a second uplink transmission manner and a third uplink transmission manner;

where the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

In the terminal according to the embodiment of the present disclosure, the first acquisition module is configured to:

determine that the target uplink transmission manner is the first uplink transmission manner in a case that the quantity of antenna panels supported by the terminal that are capable of simultaneous uplink transmission is 1 or the quantity of uplink resource sets supported by the terminal that are available for beam management is 1;

determine that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determine that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determine that the target uplink transmission manner is the first uplink transmission manner or the third uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determine that the target uplink transmission manner is the first uplink transmission manner or the second uplink transmission manner in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

In the terminal according to the embodiment of the present disclosure, in a case that the transmission capability of the terminal includes a scheduling indication manner supported by the terminal and the scheduling indication manner supported by the terminal includes at least two scheduling indication manners, the terminal according to the embodiment of the present disclosure further includes a determination module configured to, prior to the selecting, by the first acquisition module according to the transmission capability of the terminal, at least one uplink transmission manner among a plurality of preconfigured uplink transmission manners as the target uplink transmission manner:

select, according to the transmission capability of the terminal, one scheduling indication manner among the at least two scheduling indication manners supported by the terminal as a scheduling indication manner of the terminal; or, report the transmission capability of the terminal to a network device, acquire one scheduling indication manner selected by the network device among the at least two scheduling indication manners supported by the terminal according to the transmission capability of the terminal, and use the one scheduling indication manner as a scheduling indication manner of the terminal; or, report the transmission capability of the terminal to a network device, acquire at least one recommended scheduling indication manner selected by the network device among the at least two scheduling indication manners supported by the terminal according to the transmission capability of the terminal, select one scheduling indication manner among the at least one recommended scheduling indication manner, and use the one scheduling indication manner as a scheduling indication manner of the terminal; or, identify, according to the transmission capability of the terminal, at least one recommended scheduling indication manner among the at least two scheduling indication manners supported by the terminal, transmit the at least one recommended scheduling indication manner to a network device, and use a scheduling indication manner selected by the network device among the at least one recommended scheduling indication manner as a scheduling indication manner of the terminal.

In the terminal according to the embodiment of the present disclosure, in the case that the terminal supports joint uplink data transmission from at least two antenna panels, according to a correspondence between data layers of the uplink data and the antenna panels of the terminal in the target transmission manner, a data layer of uplink data may be transmitted via one antenna panel to save terminal transmission power and reduce transmission complexity, or a data layer of uplink data may be transmitted jointly via multiple antenna panels to improve transmission rate.

Figure 11:
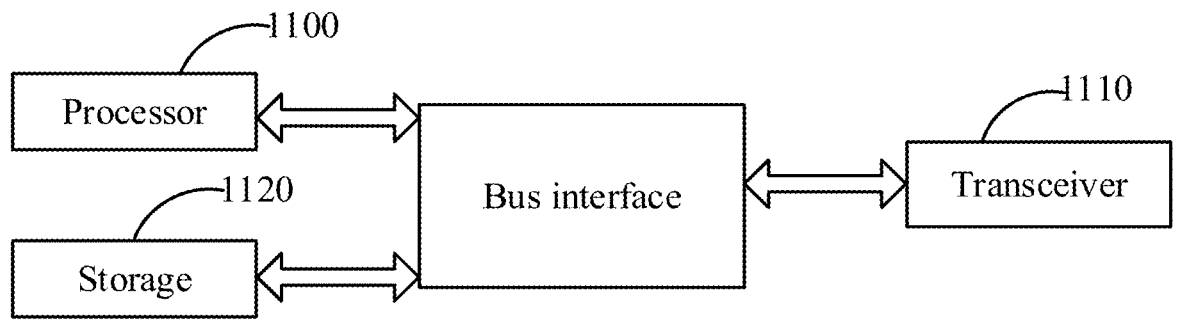
FIG. 11 is a structure diagram of a network device according to an embodiment of the present disclosure.

As shown in FIG. 11, an embodiment of the present disclosure further provides a network device. The network device may specifically be a base station and includes a storage 1120, a processor 1100, a transceiver 1110, a bus interface and a computer program stored in the storage 1120 and configured to be executed by the processor 1100, where processor 1100 is configured to read the program in the storage 1120 to implement following processes:
- acquiring, through the transceiver, transmission information reported by a terminal, where the transmission information includes at least one recommended uplink transmission manner corresponding to a transmission capability of the terminal and/or the transmission capability of the terminal;
- indicating an uplink transmission manner to the terminal according to the transmission information.

In FIG. 11, a bus architecture may include any number of interconnected buses and bridges, and connects various circuits including one or more processors represented by the processor 1100 and storage represented by the storage 1120. The bus architecture may also connect various other circuits such as peripherals, voltage regulators and power management circuits, which is well known in the art. Therefore, a detailed description thereof is omitted herein. A bus interface provides an interface. The transceiver 1110 may be multiple elements, i.e., including a transmitter and a receiver, to provide a unit for communication with various other apparatuses on the transmission medium. The processor 1100 is responsible for supervising the bus architecture and normal operation and the storage 1120 may store the data being used by the processor 1100 during operation.

Optionally, the processor 1100 is further configured to execute the program perform:
- in a case that the transmission information is the transmission capability of the terminal, selecting, according to the transmission capability of the terminal, at least one uplink transmission manner among a plurality of preconfigured uplink transmission manners and indicating the at least one uplink transmission manner to the terminal; or,
- in a case that the transmission information is the at least one recommended uplink transmission manner corresponding to the transmission capability of the terminal and the transmission capability of the terminal, selecting, according to the transmission capability of the terminal, at least one uplink transmission manner among the at least one recommended uplink transmission manner and indicating the at least one uplink transmission manner to the terminal; or,
- in a case that the transmission information is the at least one recommended uplink transmission manner corresponding to the transmission capability of the terminal, selecting at least one uplink transmission manner among the at least one recommended uplink transmission manner and indicating the at least one uplink transmission manner to the terminal.

Optionally, the transmission capability of the terminal includes at least one of:
- a quantity of antenna panels supported by the terminal that are capable of simultaneous uplink transmission;
- a quantity of uplink resource sets supported by the terminal that are available for beam management;
- a quantity of antenna panels supported by the terminal that are capable of coherent transmission;
- a scheduling indication manner supported by the terminal.

Optionally, the scheduling indication manner supported by the terminal includes at least one of following scheduling indication manners:
- a first scheduling indication manner, referring to that target information is indicated for each antenna panel of the terminal;
- a second scheduling indication manner, referring to that the target information and position information between any two antenna panels of the terminal are indicated for each antenna panel of the terminal, where the position information includes an amplitude and/or phase weighting factor;
- a third scheduling indication manner, referring to that the target information is indicated jointly for all antenna panels provided for the terminal;
where the target information includes transmit precoding matrix index (TPMI) and/or transmit rank index (TM).

Optionally, the plurality of preconfigured uplink transmission manners includes: a first uplink transmission manner, a second uplink transmission manner and a third uplink transmission manner;
- where the first uplink transmission manner refers to that one antenna panel is selected among at least two antenna panels provided for the terminal, and all data layers of the uplink data are transmitted on the selected antenna panel;
- the second uplink transmission manner refers to that all data layers of the uplink data are transmitted on each antenna panel of the terminal;
- the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

Optionally, the processor 1100 is further configured to execute the program perform:
- indicating the first uplink transmission manner to the terminal in a case that the quantity of antenna panels supported by the terminal that are capable of simultaneous uplink transmission is 1 or the quantity of uplink resource sets supported by the terminal that are available for beam management is 1;
- indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;
- indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

indicating the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

indicating the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

Optionally, in a case that the transmission capability of the terminal includes a scheduling indication manner supported by the terminal and the scheduling indication manner supported by the terminal includes at least two scheduling indication manners, the processor 1100 is further configured to execute the program perform:

selecting, according to the transmission capability of the terminal, one scheduling indication manner among the at least two scheduling indication manners supported by the terminal as a scheduling indication manner of the terminal, and indicating the one scheduling indication manner to the terminal; or, selecting, according to the transmission capability of the terminal, at least one recommended scheduling indication manner among the at least two scheduling indication manners supported by the terminal, and indicating the at least one recommended scheduling indication manner to the terminal; or, selecting one scheduling indication manner among at least one recommended scheduling indication manner transmitted by the terminal as a scheduling indication manner of the terminal, and indicating the one scheduling indication manner to the terminal.

In some embodiments of the present disclosure, a computer readable storage medium is further provided. The computer readable storage medium stores therein a computer program. The computer program is configured to be executed by a processor to implement the following steps:

acquiring transmission information reported by a terminal, where the transmission information includes at least one recommended uplink transmission manner corresponding to a transmission capability of the terminal and/or the transmission capability of the terminal;

indicating an uplink transmission manner to the terminal according to the transmission information.

The computer program, when being executed by a processor, can achieve all implementations of the method embodiments applied to the network device side. To avoid repetition, a detailed description is omitted herein.

Figure 12:
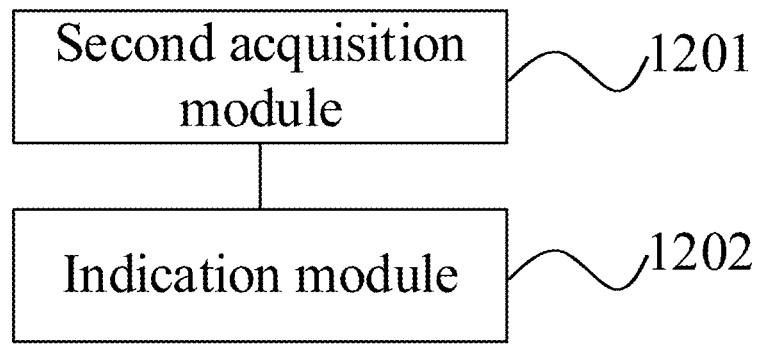
FIG. 12 is a modular diagram of a network device according to an embodiment of the present disclosure.

As shown in FIG. 12, an embodiment of the present disclosure further provides a network device. The network device includes:

a second acquisition module 1201, configured to acquire transmission information reported by a terminal, where the transmission information includes at least one recommended uplink transmission manner corresponding to a transmission capability of the terminal and/or the transmission capability of the terminal;

an indication module 1202, configured to indicate an uplink transmission manner to the terminal according to the transmission information.

In the network device according to the embodiment of the present disclosure, the indication module is configured to:

in a case that the transmission information is the transmission capability of the terminal, select, according to the transmission capability of the terminal, at least one uplink transmission manner among a plurality of preconfigured uplink transmission manners and indicate the at least one uplink transmission manner to the terminal; or, in a case that the transmission information is the at least one recommended uplink transmission manner corresponding to the transmission capability of the terminal and the transmission capability of the terminal, select, according to the transmission capability of the terminal, at least one uplink transmission manner among the at least one recommended uplink transmission manner and indicate the at least one uplink transmission manner to the terminal; or, in a case that the transmission information is the at least one recommended uplink transmission manner corresponding to the transmission capability of the terminal, select at least one uplink transmission manner among the at least one recommended uplink transmission manner and indicating the at least one uplink transmission manner to the terminal.

In the network device according to the embodiment of the present disclosure, the transmission capability of the terminal includes at least one of:

a quantity of antenna panels supported by the terminal that are capable of simultaneous uplink transmission;

a quantity of uplink resource sets supported by the terminal that are available for beam management;

a quantity of antenna panels supported by the terminal that are capable of coherent transmission;

a scheduling indication manner supported by the terminal.

In the network device according to the embodiment of the present disclosure, the scheduling indication manner supported by the terminal includes at least one of following scheduling indication manners:

a first scheduling indication manner, referring to that target information is indicated for each antenna panel of the terminal;

a second scheduling indication manner, referring to that the target information and position information between any two antenna panels of the terminal are indicated for each antenna panel of the terminal, where the position information includes an amplitude and/or phase weighting factor;

a third scheduling indication manner, referring to that the target information is indicated jointly for all antenna panels provided for the terminal;

where the target information includes transmit precoding matrix index (TPMI) and/or transmit rank index (TM).

In the network device according to the embodiment of the present disclosure, the plurality of preconfigured uplink transmission manners includes: a first uplink transmission manner, a second uplink transmission manner and a third uplink transmission manner;

where the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, where there is a one-to-one correspondence between the groups and the antenna panels, N is a quantity of the antenna panels of the terminal, and N is a positive integer greater than 1.

In the network device according to the embodiment of the present disclosure, the indication module is configured to:

indicate the first uplink transmission manner to the terminal in a case that the quantity of antenna panels supported by the terminal that are capable of simultaneous uplink transmission is 1 or the quantity of uplink resource sets supported by the terminal that are available for beam management is 1;

indicate the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

indicate the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

indicate the first uplink transmission manner or the third uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

indicate the first uplink transmission manner or the second uplink transmission manner to the terminal in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

where M is a positive integer greater than 1.

In the network device according to the embodiment of the present disclosure, in a case that the transmission capability of the terminal includes a scheduling indication manner supported by the terminal and the scheduling indication manner supported by the terminal includes at least two scheduling indication manners, the network device further includes a selection module, configured to:

select, according to the transmission capability of the terminal, one scheduling indication manner among the at least two scheduling indication manners supported by the terminal as a scheduling indication manner of the terminal, and indicate the one scheduling indication manner to the terminal; or, select, according to the transmission capability of the terminal, at least one recommended scheduling indication manner among the at least two scheduling indication manners supported by the terminal, and indicate the at least one recommended scheduling indication manner to the terminal; or, select one scheduling indication manner among at least one recommended scheduling indication manner transmitted by the terminal as a scheduling indication manner of the terminal, and indicate the one scheduling indication manner to the terminal.

The network device according to the embodiment of the present disclosure indicates the uplink transmission manner to the terminal according to the transmission information reported by the terminal, so that the terminal determines the target uplink transmission manner according to the uplink transmission manner indicated by the network device, and transmits a data layer of the uplink data via at least one antenna panel of the terminal according to the correspondence between data layers of the uplink data and antenna panels of the terminal in the target uplink transmission manner.

An embodiment of the present disclosure further provides a computer readable storage medium storing therein a computer program, the computer program is configured to be executed by a processor to implement various processes of the foregoing method embodiments, and may achieve the same technical effects. To avoid repetition, a detailed description is omitted herein. The computer readable storage medium may be for example: a read-only memory (ROM), a random access memory (RAM), a magnetic disk, an optical disc or the like.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure. The electronic hardware may include, but is not limited to: an electronic circuit, application specific integrated circuit (ASIC), programmable logic device, programmable processor, and the like.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed system, device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

In various embodiments of the present disclosure, it is understood, the numbering of various processes is not intended to imply an execution sequence. The execution sequence of the processes should be determined in accordance with the functions and inherent logic thereof, and by no means constitutes any limitation as to the implementation of the embodiments of the present disclosure.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A data transmission method, applied to a terminal provided with at least two antenna panels for uplink transmission, comprising:
   acquiring a target uplink transmission manner corresponding to a transmission capability of the terminal;
   transmitting a data layer of uplink data via at least one antenna panel of the terminal according to a correspondence between data layers of the uplink data and the antenna panels of the terminal in the target uplink transmission manner,
   wherein the transmission capability of the terminal comprises:
   a scheduling indication manner supported by the terminal,
   wherein the scheduling indication manner supported by the terminal comprises at least one of following scheduling indication manners:
   a first scheduling indication manner, referring to that target information is indicated for each antenna panel of the terminal;
   a second scheduling indication manner, referring to that the target information and an amplitude and/or phase weighting factor between any two antenna panels of the terminal are indicated for each antenna panel of the terminal;
   a third scheduling indication manner, referring to that the target information is indicated jointly for all antenna panels provided for the terminal;
   wherein the target information comprises transmit precoding matrix index (TPMI) and/or transmit rank index (TRI),
   wherein the acquiring the target uplink transmission manner corresponding to the transmission capability of the terminal comprises:
   selecting, according to the transmission capability of the terminal, at least one uplink transmission manner among a plurality of preconfigured uplink transmission manners as the target uplink transmission manner, wherein correspondences between data layers of the uplink data and the antenna panels of the terminal in different uplink transmission manners are different from each other;
   wherein prior to the selecting, according to the transmission capability of the terminal, at least one uplink transmission manner among a plurality of preconfigured uplink transmission manners as the target uplink transmission manner, the method further comprises:
   selecting, according to the transmission capability of the terminal, one scheduling indication manner among the at least two scheduling indication manners supported by the terminal as a scheduling indication manner of the terminal; or,
   reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or,
   reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or,
   identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal,
   wherein the plurality of preconfigured uplink transmission manners comprises: a first uplink transmission manner, a second uplink transmission manner and a third uplink transmission manner;
   wherein the first uplink transmission manner refers to that one antenna panel is selected among at least two antenna panels provided for the terminal, and all data layers of the uplink data are transmitted on the selected antenna panel;
   the second uplink transmission manner refers to that all data layers of the uplink data are transmitted on each antenna panel of the terminal;
   the third uplink transmission manner refers to that all data layers of the uplink data are divided into N groups, and each group of data layers is transmitted on one antenna panel, wherein there is a one-to-one correspondence between the groups and the antenna panels, N is a quantity of the antenna panels of the terminal, and N is a positive integer greater than 1,
   wherein the selecting, according to the transmission capability of the terminal, at least one uplink transmission manner among a plurality of preconfigured uplink transmission manners as the target uplink transmission manner comprises:
   determining that the target uplink transmission manner is the first uplink transmission manner, in a case that the quantity of antenna panels supported by the terminal that are capable of simultaneous uplink transmission is 1 or the quantity of uplink resource sets supported by the terminal that are available for beam management is 1;

determining that the target uplink transmission manner is the first uplink transmission manner or the third uplink transmission manner, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determining that the target uplink transmission manner is the first uplink transmission manner or the second uplink transmission manner, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner, in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner, in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

wherein M is a positive integer greater than 1.

2. A data transmission method, applied to a network device, comprising:

acquiring transmission information reported by a terminal, wherein the transmission information comprises at least one recommended uplink transmission manner corresponding to a transmission capability of the terminal and/or the transmission capability of the terminal;

indicating an uplink transmission manner to the terminal according to the transmission information, wherein the transmission capability of the terminal comprises:

a scheduling indication manner supported by the terminal, wherein the scheduling indication manner supported by the terminal comprises at least one of following scheduling indication manners:

a first scheduling indication manner, referring to that target information is indicated for each antenna panel of the terminal;

a second scheduling indication manner, referring to that the target information and position information between any two antenna panels of the terminal are indicated for each antenna panel of the terminal, wherein the position information comprises an amplitude and/or phase weighting factor;

a third scheduling indication manner, referring to that the target information is indicated jointly for all antenna panels provided for the terminal;

wherein the target information comprises transmit precoding matrix index (TPMI) and/or transmit rank index (TRI), wherein the indicating the uplink transmission manner to the terminal according to the transmission information comprises:

in a case that the transmission information is the transmission capability of the terminal, selecting, according to the transmission capability of the terminal, at least one uplink transmission manner among a plurality of preconfigured uplink transmission manners and indicating the at least one uplink transmission manner to the terminal;

wherein prior to the selecting, according to the transmission capability of the terminal, at least one uplink transmission manner among a plurality of preconfigured uplink transmission manners and indicating the at least one uplink transmission manner to the terminal, the method further comprises:

selecting, according to the transmission capability of the terminal, one scheduling indication manner among the at least two scheduling indication manners supported by the terminal as a scheduling indication manner of the terminal, and indicating the one scheduling indication manner to the terminal; or, selecting, according to the transmission capability of the terminal, at least one recommended scheduling indication manner among the at least two scheduling indication manners supported by the terminal, and indicating the at least one recommended scheduling indication manner to the terminal; or, selecting one scheduling indication manner among at least one recommended scheduling indication manner transmitted by the terminal as a scheduling indication manner of the terminal, and indicating the one scheduling indication manner to the terminal, wherein the plurality of preconfigured uplink transmission manners comprises: a first uplink transmission manner, a second uplink transmission manner and a third uplink transmission manner;

wherein the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, wherein there is a one-to-one correspondence between the groups and the antenna panels, N is a quantity of the antenna panels of the terminal, and N is a positive integer greater than 1, wherein the selecting, according to the transmission capability of the terminal, at least one uplink transmission manner among a plurality of preconfigured uplink transmission manners and indicating the at least one uplink transmission manner to the terminal comprise:

indicating the first uplink transmission manner to the terminal, in a case that the quantity of antenna panels supported by the terminal that are capable of simultaneous uplink transmission is 1 or the quantity of uplink resource sets supported by the terminal that are available for beam management is 1;

indicating the first uplink transmission manner or the third uplink transmission manner to the terminal, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

indicating the first uplink transmission manner or the second uplink transmission manner to the terminal, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

indicating the first uplink transmission manner or the third uplink transmission manner to the terminal, in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

indicating the first uplink transmission manner or the second uplink transmission manner to the terminal, in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

wherein M is a positive integer greater than 1.

3. A terminal, provided with at least two antenna panels for uplink transmission, comprising: a transceiver, a storage, a processor and a program stored in the storage and configured to be executed by the processor, wherein the processor is configured to execute the program perform:

acquiring a target uplink transmission manner corresponding to a transmission capability of the terminal;

transmitting a data layer of uplink data via at least one antenna panel of the terminal according to a correspondence between data layers of the uplink data and the antenna panels of the terminal in the target uplink transmission manner, wherein the transmission capability of the terminal comprises:

a scheduling indication manner supported by the terminal, the scheduling indication manner supported by the terminal comprises at least one of following scheduling indication manners:

a first scheduling indication manner, referring to that each antenna panel of the terminal indicates target information;

a second scheduling indication manner, referring to that each antenna panel of the terminal indicates target information and an amplitude and/or phase weighting factor between any two antenna panels of the terminal;

a third scheduling indication manner, referring to that all antenna panels provided for the terminal indicate target information jointly;

wherein the target information comprises transmit precoding matrix index (TPMI) and/or transmit rank index (TRI), wherein the processor is further configured to execute the program perform:

selecting, according to the transmission capability of the terminal, at least one uplink transmission manner among a plurality of preconfigured uplink transmission manners as the target uplink transmission manner, wherein correspondences between data layers of the uplink data and the antenna panels of the terminal in different uplink transmission manners are different from each other;

wherein the processor is further configured to execute the program perform:

selecting, according to the transmission capability of the terminal, one scheduling indication manner among the at least two scheduling indication manners supported by the terminal as a scheduling indication manner of the terminal; or, reporting the transmission capability of the terminal to a network device, acquiring one scheduling indication manner selected by the network device among the at least two scheduling indication manners supported by the terminal according to the transmission capability of the terminal, and using the one scheduling indication manner as a scheduling indication manner of the terminal; or, reporting the transmission capability of the terminal to a network device, acquiring at least one recommended scheduling indication manner selected by the network device among the at least two scheduling indication manners supported by the terminal according to the transmission capability of the terminal, selecting one scheduling indication manner among the at least one recommended scheduling indication manner, and using the one scheduling indication manner as a scheduling indication manner of the terminal; or, identifying, according to the transmission capability of the terminal, at least one recommended scheduling indication manner among the at least two scheduling indication manners supported by the terminal, transmitting the at least one recommended scheduling indication manner to a network device, and using a scheduling indication manner selected by the network device among the at least one recommended scheduling indication manner as a scheduling indication manner of the terminal, wherein the plurality of preconfigured uplink transmission manners comprises: a first uplink transmission manner, a second uplink transmission manner and a third uplink transmission manner;

wherein the first uplink transmission manner refers to that one antenna panel is selected among at least two antenna panels provided for the terminal, and all data layers of the uplink data are transmitted on the selected antenna panel;

the second uplink transmission manner refers to that all data layers of the uplink data are transmitted on each antenna panel of the terminal;

the third uplink transmission manner refers to that all data layers of the uplink data are divided into N groups, and each group of data layers is transmitted on one antenna panel, wherein there is a one-to-one correspondence between the groups and the antenna panels, N is a quantity of the antenna panels of the terminal, and N is a positive integer greater than 1, wherein the processor is further configured to execute the program perform:

determining that the target uplink transmission manner is the first uplink transmission manner, in a case that the quantity of antenna panels supported by the terminal that are capable of simultaneous uplink transmission is 1 or the quantity of uplink resource sets supported by the terminal that are available for beam management is 1;

determining that the target uplink transmission manner is the first uplink transmission manner or the third uplink transmission manner, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is 1;

determining that the target uplink transmission manner is the first uplink transmission manner or the second uplink transmission manner, in a case that the quantity of antenna panels supported by the terminal that are capable of simultaneous uplink transmission or the quantity of uplink resource sets supported by the terminal that are available for beam management is M, and the quantity of antenna panels supported by the terminal that are capable of coherent transmission is M;

determining that the target uplink transmission manner is the first uplink transmission manner or the third uplink transmission manner, in a case that the quantity of antenna panels supported by the terminal that are capable of simultaneous uplink transmission or the quantity of uplink resource sets supported by the terminal that are available for beam management is M, and the scheduling indication manner supported by the terminal is the first scheduling indication manner;

determining that the target uplink transmission manner is the first uplink transmission manner or the second uplink transmission manner, in a case that the quantity of antenna panels supported by the terminal that are capable of simultaneous uplink transmission or the quantity of uplink resource sets supported by the terminal that are available for beam management is M, and the scheduling indication manner supported by the terminal is the second scheduling indication manner or the third scheduling indication manner;

wherein M is a positive integer greater than 1.

4. A network device, comprising: a transceiver, a storage, a processor and a program stored in the storage and configured to be executed by the processor, wherein the processor is configured to execute the program to perform the data transmission method according to claim 2.

* * * * *